Figure 1:
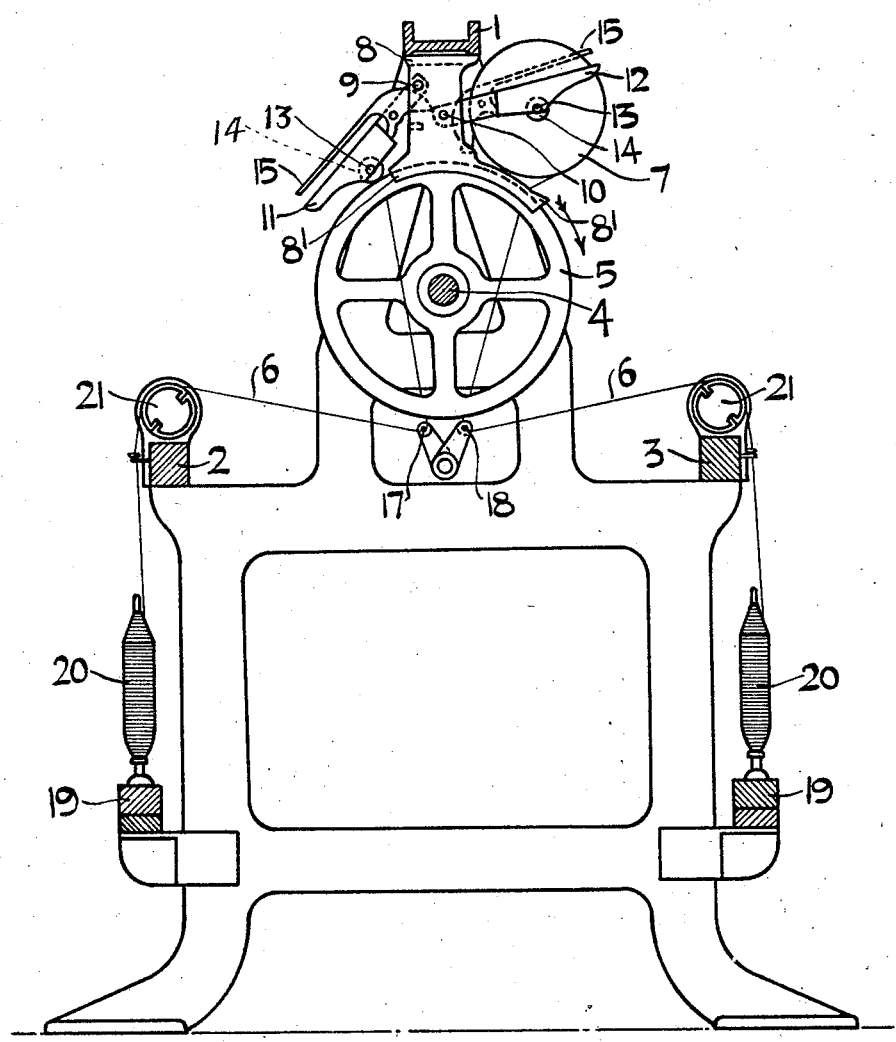

June 17, 1930. T. A. BOYD ET AL 1,763,753
WINDING FRAME FOR YARNS OR THREADS
Filed Jan. 10, 1928

Inventors
THOMAS ALEXANDER BOYD
HAROLD ARTHUR BOYD
by their attorneys
Howson and Howson Patented June 17, 1930

1,763,753

UNITED STATES PATENT OFFICE

THOMAS ALEXANDER BOYD AND HAROLD ARTHUR BOYD, OF SHETTLESTON, NEAR GLASGOW, SCOTLAND

WINDING FRAME FOR YARNS OR THREADS

Application filed January 10, 1928, Serial No. 245,702, and in Great Britain February 11, 1927.

This invention refers to what are known as split drum winders for winding yarn into cross wound rolls or cheeses or into cones. A split drum is a pulley the periphery of which drives the roll or cheese and which has a helical groove formed around and through the periphery to traverse the yarn to and fro while it is being wound. Our invention comprises improvements in the construction and working of such machines.

According to this invention a split drum is adapted to wind two cheeses at a time, that is, one cheese on each side of the drum. The thread guide plate on one side of the drum is as usual behind the cheese and on the other side in front of the cheese. The guide plate is supported so as to permit the thread being inserted between the drum and the cheese and the thread plate before it passes into the drum to be traversed to and fro. The split drums by preference are mounted on and are driven by a central shaft positively or frictionally.

In the drawings—

Figure 2:
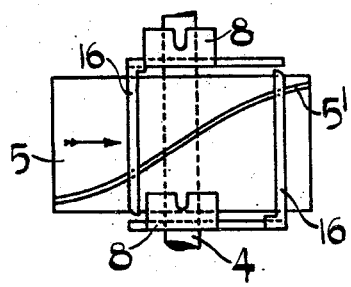

Figure 1 is an end elevation of an apparatus constructed in accordance with the invention, certain parts being shown in section, and Fig. 2 is a plan view showing the split drum, the thread plates and the mounting of the latter.

In giving a practical example of a split drum winder to wind cotton yarns from ring spools on to cheeses, we employ suitable framing having a central top rail 1 and low rails 2 and 3 all horizontal and parallel to each other, extending from end to end of the machine and suitably disposed and fixed to the framing. Centrally located between the front and rear of the framing there is disposed a drum shaft 4 at a suitable distance below the top rail 1. The drum shaft 4 is horizontal and preferably parallel to the top rail 1, and the low rails 2 and 3. On the drum shaft 4 at a suitable distance apart we mount a split drum 5 runing clockwise when viewed from the driving end. The split drum 5 is made of one casting cored out inside and has milled around and through its periphery a helical groove $5^1$ to receive the thread 6 which enters at the bottom and emerges at the upper side of the periphery and is wound on to a cheese 7 hereafter described. On the under side of the top rail 1 we fix cheese holder brackets 8 extending downwards and carrying a pair of horizontal rods 9 and 10 which are parallel to each other and disposed at a suitable distance from the upper side of the split drum 5. On these rods 9 and 10 we hinge on each side of a vertical plane through the axis of the split drum a pair of cheese holders 11 and 12 and mount between the two cheese holders of each pair a cheese spindle 13. On the cheese spindle 13 we place a wood tube 14 filling the space between the two arms of the cheese holders 11 and 12. When the cheese holder is lowered the wood tube 14 rests on and is driven by the split drum 5 and has wound upon it the yarn coming from below through the split drum. On each cheese holder we mount a catch lever 15 whereby the cheese may be lifted clear of the split drum 5 when required. The cheese holder brackets 8 extend downwards past the side of the split drum 5 and are made T shaped extending on both sides of the vertical centre line of the split drum 5. At the end of the T shaped part $8^1$ we fix on each side of the split drum 5 a thread plate 16. On the left side of the drum looking from the driving end, the drum revolving clockwise, we mount the thread plate 16 behind the cheese (that is to say, between the cheese and the vertical centre line through the split drum) so that the thread will be carried against the thread plate. On the right hand side we mount the thread plate 16 in front of the cheese (that is to say, with the cheese between the thread plate and the vertical centre line through the split drum) for the same reason. The thread plates 16 are supported preferably only at one end. By this method of fixing the thread plate 16 the thread on the right side of the frame can be passed over the end of the thread plate 16 to the back edge of the thread plate 16 against which it is driven by the split drum 5. Similarly in the case of the other thread plate which appears to the left of the vertical centre line through the split drum, the thread is driven by the split drum against its outside edge as will be seen upon considering Figure 2.

Below the drum 5 we mount for each side cross wires 17 and 18 parallel with the split drum axis extending across the face of the drum 5. Below and on each side of the split drum 5 and also on each side of the frame we mount at a suitable height on the framing a creel 19 to carry the ring spools 20 and above same a drag bar 21.

It will thus be understood that the thread is carried from the ring spools 20, over the drag bar 21, inwards and around the cross wires 17 and 18 below the split drum 5 through the helical groove $5^1$ in the split drum 5, upward through the interior of the drum, out through the helical groove 5 above, against the thread plate 16, and on to the tube 14 to be wound.

It will thus be seen that by friction first upon the wood tube 14 and then upon the cheese that the split drum 5 winds each cheese. It will also be seen that the split drum 5 directs the winding of the thread passing through its grooves upon the respective cheese. Finally, it will be observed that in the apparatus which we have described, the split drum both winds and determines the position of the windings upon each of two cheeses simultaneously.

With the understanding that the specific apparatus described and illustrated in the drawings is presented merely by way of example and to indicate how the invention may be applied, we claim.

1. In a so-called split drum winder, a split drum and means for winding two cheeses one on each side of said split drum in combination with a thread plate supported only at one end and thereby being adapted to permit insertion of the thread between the split drum and the thread plate, substantially as described.

2. In a so-called split drum winder, a split drum having a helical groove therein and a pair of cheese holders mounted on each side of a vertical plane through the axis of said split drum, and thread plates each supported at one end also mounted on either side of the vertical plane and adapted to cooperate with said plit drum and said cheese holders.

In testimony whereof we have signed our names to this specification.

T. A. BOYD.
H. A. BOYD.